United States Patent [19]

Godwin et al.

[11] Patent Number: 4,543,420

[45] Date of Patent: Sep. 24, 1985

[54] PYROMELLITATE PLASTICIZERS AND VINYL CHLORIDE

[75] Inventors: Allen D. Godwin; Edward J. Wickson, both of Baton Rouge, La.

[73] Assignee: Exxon Research & Engineering Co., Florham Park, N.J.

[21] Appl. No.: 660,735

[22] Filed: Oct. 15, 1984

[51] Int. Cl.$^4$ .............................................. C07C 69/76
[52] U.S. Cl. ........................................ 560/76; 524/298
[58] Field of Search ........................... 560/76; 524/298

[56] References Cited

U.S. PATENT DOCUMENTS

| | | | |
|---|---|---|---|
| 3,167,524 | 1/1965 | Lauck et al. | 260/31.6 |
| 3,280,063 | 10/1966 | Zawadzki et al. | 525/227 |
| 3,296,298 | 1/1967 | Rowland | 260/475 |
| 4,029,685 | 6/1977 | Priddy | 526/340 |
| 4,259,225 | 3/1981 | Saito et al. | 524/567 |
| 4,317,760 | 3/1982 | Tsuda et al. | 524/299 |
| 4,334,080 | 6/1982 | Abe et al. | 560/99 |
| 4,410,717 | 10/1983 | Oxenrider et al. | 524/323 |
| 4,421,885 | 12/1983 | Tsuda et al. | 524/111 |
| 4,460,785 | 7/1984 | Oxenrider et al. | 560/76 |

FOREIGN PATENT DOCUMENTS 901709  5/1972  Canada ................................ 400/62

OTHER PUBLICATIONS

Chemical Abstracts, vol. 66, 1967, p. 358, 3136p.
J. R. Darby, *Polymer Engineering & Science*, 295, 300, (Oct. 1967).
J. Nanu et al., *Materiale Plastice*, 12(2), 138-142, (1975).
A. DiCio et al., *La Chimica E L'Industria*, vol. 56, 8-12, (1974).

*Primary Examiner*—Joseph L. Schofer
*Assistant Examiner*—N. Sarofin
*Attorney, Agent, or Firm*—Jack B. Murray, Jr.

[57] ABSTRACT

According to the present invention, novel pyromellitate plasticizers are provided which comprise members selected from the group consisting of compounds of the formula (I):

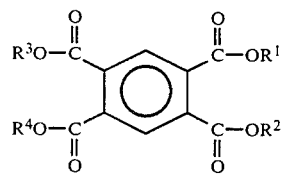

wherein $R^1$, $R^2$, $R^3$ and $R^4$ are the same or different and comprise members selected from the group consisting of iso-nonyl and iso-decyl groups.

5 Claims, 1 Drawing Figure

PYROMELLITATE PLASTICIZERS AND VINYL CHLORIDE

BACKGROUND OF THE INVENTION

1. FIELD OF THE INVENTION

This invention relates generally to vinyl chloride plasticizers and more particularly to novel low volatility plasticizers.

2. DESCRIPTION OF THE PRIOR ART

Many polymeric materials, e.g., poly(vinylchloride), cellulosics, etc., are of a relatively hard and brittle nature. To improve softness and flexibility, so that the resulting product is usable in a wide variety of applications, it is necessary to add a plasticizing agent to the polymer. The basic attributes of a good plasticizer are:

(1) compatibility with the polymer or resin it is to plasticize;
(2) capability of imparting desired processability and softness, etc.;
(3) thermal stability under the conditions of processing and subsequent aging; and
(4) Permanence to loss, particularly through volatilization, but also through solvent extraction, migration or exudation.

Compatibility is normally defined as the ability of the plasticizer to produce a clear film and to remain more or less homogeneously dispersed throughout the resin composition, particularly on aging. Permanence refers to the tendency of the plasticizer to resist loss through volatilization, chemical breakdown, extraction by water, soapy water, or organic solvents, migration and exudation. Other important attributes of a plasticizer are efficiency, i.e., the amount of plasticizer required to impart desired properties (depending on relative costs and specific gravities of the plasticizer and resin, high efficiency can result in reduced or increased volume costs of the plasticized resin composition), ability to impart low temperature flexibility to a resin, ability to allow ease of processing to the resin system, i.e., flows and molds or extrudes readily and the like.

U.S. Pat. No. 4,334,080 relates to a process for preparation of benzenecarboxylic acid esters by reacting benzenecarboxylic acids having 8-10 carbon atoms, or the corresponding carboxylic acid anhydrides, in the presence of amorphous aluminum compound as a catalyst and an alkali metal compound as a promoter; with an aliphatic alcohol having 7-11 carbon atoms, including 2-ethylhexanol, n-octanol, and a variety of straight chain alcohol mixtures (7 to 9, 9 to 10 and 9 to 11 carbon atoms mixtures).

U.S. Pat. No. 3,296,298 relates to polyvinyl chloride compositions plasticized with tetraalkyl pyromellitates in which the alkyl group contains from 6 to 8 carbon atoms, and with pyromellitic esters of branched 6, 7 or 8 carbon-containing alkanol mixtures. Tetraalkyl pyromellitates in which the alkyl groups exceed 8 carbon atoms are said to be of no practical value in polyvinyl resins because they are totally inefficient and fail to impart low temperature flexibility, thereby leading to products which are excessively brittle at low temperature.

Flow promoters for records are disclosed in U.S. Pat. No. 3,280,063 comprising $C_{10}$ to $C_{20}$ alkyl esters of mono-nuclear aromatic acid of 3 to 6 carboxylic groups, which are employed in amounts of from about 0.05 to 10 parts per 100 parts of total record composition.

Canadian Pat. No. 901,709 relates to vinyl halide resin compositions comprising 100 parts by weight of a vinyl halide resin, 1-2 parts by weight of triallyl cyanurate, 0.5 to 5 parts by weight of an organic peroxide, and 10 to 100 parts by weight of an alkyl pyromellitate ester having 4 to 10 carbon atoms in the ester group. However, only dibutyl-di-(2-ethyl-hexyl)pyromellitate was tested.

Tetra-(2-ethylhexyl)pyromellitate and tetra-(iso-octyl)pyromellitate are known to exhibit moderate exudation in compatability testing, and tetra-decyl pyromellitate is also said to exude. J. R. Darby, *Polymer Engineering & Science*, 295, 300 (October 1967).

J. Nanu, et al., *Materiale Plastice*, 12(2), 138-142 (1975) disclose the synthesis and evaluation of n-butyl, neo-butyl, n-pentyl, iso-pentyl, n-hexyl, n-heptyl, n-octyl, iso-octyl and 2-ethylhexyl pyromellitate esters as plasticizers for polyvinyl chloride.

A. DiCio et al., *La Chimica E L'Industria*, v. 56, 8-12 (1974) relates to the Alusuisse process for manufacture of high purity pyromellitic anhydride, which the authors indicate can be used in the preparation of esters of $C_6$–$C_{14}$ alcohols, which can be employed in the plasticization of PVC. Such esters are said to have the features of volatility, high heat stability, excellent plasticizing ability even at low temperatures, outstanding dielectric properties and no tendency to migrate. However, no example of the preparation of such esters or their attempted use as plasticizers is given, and the broad utility statement refuted by the weight of the above other prior art teachings for higher alcohol pyromellitic esters.

SUMMARY OF THE INVENTION

According to the present invention, novel pyromellitate plasticizers are provided which comprise members selected from the group consisting of compounds of the formula (I):

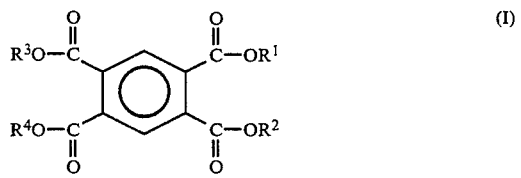

wherein $R^1$, $R^2$, $R^3$ and $R^4$ are the same or different and comprise members selected from the group consisting of iso-nonyl and iso-decyl groups.

The novel plasticizers of this invention have been found to impart improved low temperature flexibility, low volatility, good electrical properties and good high temperature aging properties to the plasticized compositions in contrast to prior art's negative teachings of the incompatibility of such higher branched pyromellitates.

DETAILED DESCRIPTION OF THE INVENTION

Figure 1:
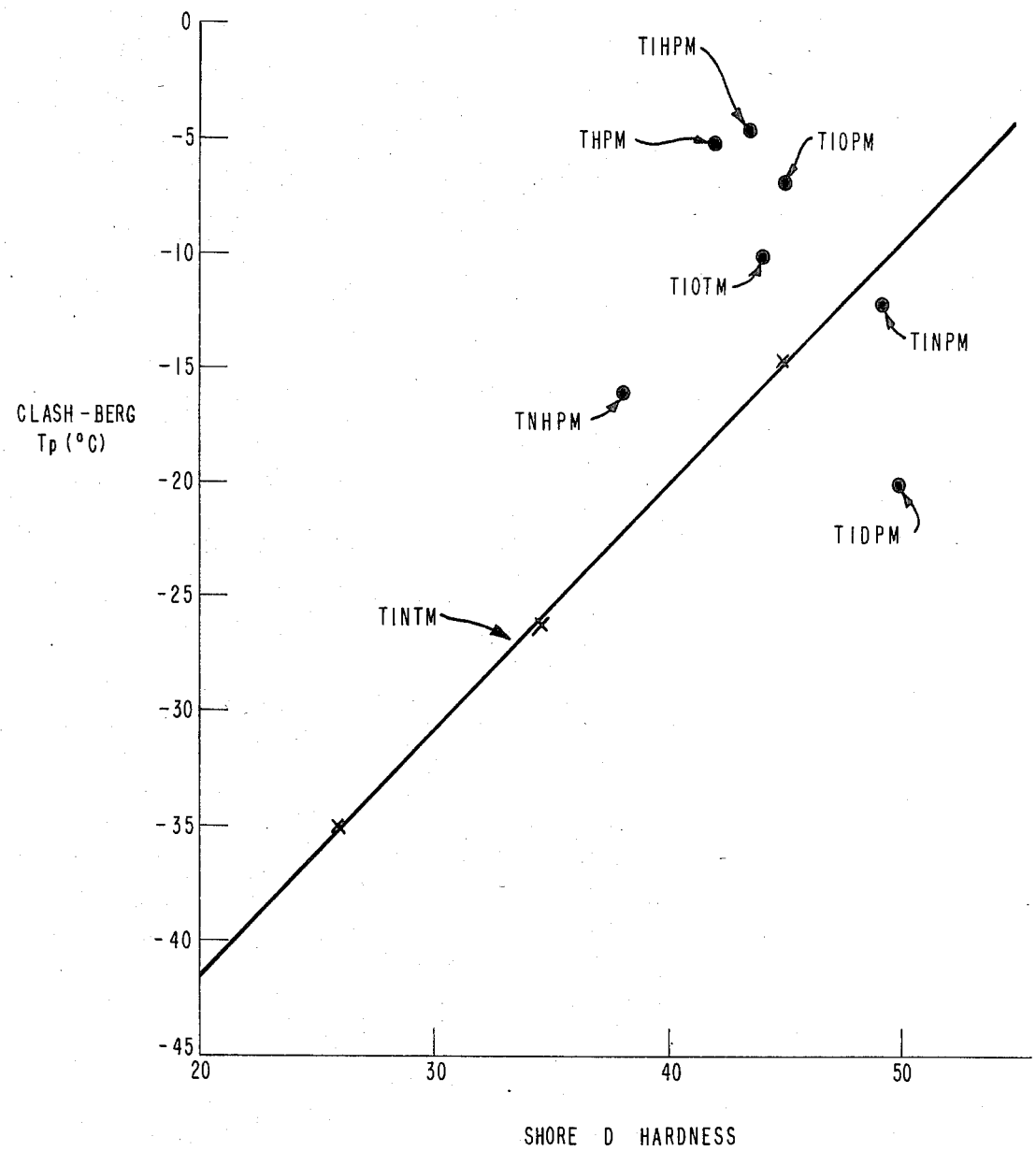
FIG. 1 is a plot of Clash-Berg, $T_f$ temperatures (°C.) versus Shore D hardness for the molded PVC specimens tested in Example 10, as set forth in Table V.

The novel pyromellitate plasticizers of this invention comprise members selected from the group consisting of compounds of the formula (I):

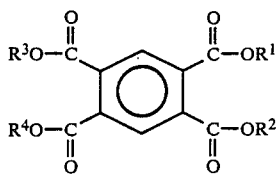

(I)

wherein $R^1$, $R^2$, $R^3$ and $R^4$ are the same or different and comprise iso-nonyl or iso-decyl. The plasticizers of this invention are therefore illustrated by 1,2,4,5-tetra-isononyl pyromellitate, 1,2,4,5-tetra-isodecyl pyromellitate, 1,2-di(isononyl)-4,5-di(isodecyl)pyromellitate, 1,4-di(isononyl)-2,5-di(isodecyl)pyromellitate, 1,5-di(isononyl)-2,4-di(isodecyl)pyromellitate, and mixtures of the foregoing. Especially preferred pyromellitates of this invention are 1,2,4,5-tetra-isononyl pyromellitate and 1,2,4,5-tetra-isodecyl pyromellitate.

The pyromellitate plasticizers of this invention can be prepared by the reaction of pyromellitic dianhydride or pyromellitic acid (i.e., benzene-1,2,4,5-tetracarboxylic acid) with the corresponding branched chain aliphatic alcohols, that is, alcohols selected from the group consisting of compounds of the formula (II)

R'OH  (II)

wherein R' comprises isononyl or isodecyl, or mixtures of such alcohols.

The conditions under which this esterification reaction occurs will be known to those skilled in the art. Both temperature and pressure may vary over wide ranges. Temperatures ranging from about 80° to 250° C. can be employed, while temperatures of 160° to 230° C. are preferred. Higher temperatures than 230° C. should generally be avoided to minimize the formation of color bodies. Pressures may also vary widely, e.g., 0.03-10 atm. and preferably 0.05 to 1 atm. The molar ratio of alcohol reactant to pyromellitic dianhydride/acid is not critical but should be at least stoichiometric, i.e., one mole of alcohol per mole of pyromellitic dianhydride/acid. However, an excess of alcohol is normally employed, and the molar ratio may range from stoichiometric to a 100% excess, preferably stoichiometric to a 50% excess, more preferably to a 20% excess of alcohol reactant. The reaction period is not critical, and may range from a few minutes, e.g., 30 minutes to several hours, e.g., 6 hours. However, the reaction should be carried out for periods of time sufficient to allow for the reaction of substantially all of the pyromellitic anhydride.

The reaction may be carried out with or without a solvent or entrainer to remove water formed during the reaction. Suitable entrainers include aliphatic or aromatic hydrocarbons, for example, $C_{10}$-$C_{16}$ paraffins, e.g., decane, dodecane, etc., $C_6$-$C_{16}$ aromatics, e.g., benzene, toluene, xylene, etc. Entrainers, when employed, should normally comprise about 3-30 wt.% of the reaction mixture, preferably 5 to 10 wt.%.

Esterification reactions are normally conducted in the presence of catalytic amounts of an esterification catalyst. Illustrative of these catalysts are the strong mineral acids, e.g., $H_2SO_4$ and others such as hypophosphorous acid, p-toluenesulfonic acid, etc., or metal salts such as tin carboxylates (e.g., stannous oxalate) and titanates such as tetraisodecyl titanate. The amount of catalyst may range from about 0.05 to 5.0 wt.% based on total weight of reactants, preferably 0.1 to 0.5 wt.%.

The novel compounds thus formed may be used as is, but are preferably further purified by such standard methods as: base wash followed by water wash until neutral, stripping at about 160° C. under vacuum with or without the presence of charcoal, treatment with activated alumina or attapulgus clay or celite, molecular distillation and the like.

Generally, the novel plasticizers of this invention can be employed with a wide variety of synthetic resins and may also be used as lubricants for synthetic textile fibers, and as automatic transmission fluids, compressor and engine lubricants. However, they are preferably employed to plasticize the thermoplastic resins, particularly the vinyl resins, cellulosic resins and acrylic and methacrylic resins. However, synthetic rubber can also be plasticized with these esters. The end use of these plasticized resins may be coatings, molded or extruded materials, calendered sheeting, etc.

The vinyl resins are derived from vinyl chloride monomer and may also include the copolymers of vinyl chloride and other mono- and di-olefinically unsaturated compounds copolymerizable therewith. Illustrative of these are the copolymers of vinyl chloride, with vinylidene chloride, vinyl-esters of carboxylic acids (e.g., vinyl acetate, vinyl propionate, vinyl butyrate, and the like); esters of unsaturated acids (e.g., alkyl acrylates such as methyl acrylate and the like) and the corresponding esters of methacrylic acid and the like. However, the plasticizers may also be used in conjunction with other vinyl polymers or mixtures thereof including, for example, polyvinyl butyral, polyvinylidene chloride, polyethyl acrylate, polymethyl acrylate, and polymethyl methacrylate.

Cellulosic resins, such as cellulosic esters and mixed esters, e.g., cellulose propionate, cellulose acetate butyrate, cellulose nitrate, and the like, form another class of desirable polymers with which these novel plasticizers are useful. See also U.S. Pat. No. 3,167,524 for halogen resin systems.

The vinyl resins, particularly the vinyl halides, e.g., polyvinyl chloride and copolymers of vinyl halides are preferred.

Preferably, in vinyl resins comprising copolymers of vinyl halide with other unsaturated monomers (such as any of those indicated above), at least 70 wt.%, and more preferably at least 85 wt.% of the total monomer units in the resin are vinyl halide, e.g., vinyl chloride.

The novel plasticizers (I) of this invention are employed in plasticizing amounts, and they may be used alone as either primary plasticizers or in association with other primary or secondary plasticizers. The amount of plasticizer employed with any resin system will vary widely based on specific desired properties and the resin system itself. However, the plasticizer may be employed in amounts ranging from about 1 to 100 parts of plasticizers per hundred parts of resin by weight (phr) and preferably 10 to 75 phr.

In many instances, it is desirable to blend into the plasticizer-resin composition such common additives as fillers, clays, pigments, light and heat stabilizers, lubricants, antioxidants, etc. Commonly used stabilizers include tribasic lead sulfate, dibasic lead phthalate, barium phenate, cadium and zinc octanoates, laurates and other metallic soaps. Auxiliary stabilizers may be similarly employed, such as, for example, organic phosphites and substituted phenols. Commonly used fillers and pigments include calcium carbonate, silicates, barytes, and the like may also be employed. It is apparent that such compositions are well within the scope of this invention.

Also, the novel plasticizers of this invention can either be used as such, or they can be formulated together with other types of plasticizers, such as, for example, epoxidized fatty acid esters, polymeric plasticizers, phthalate plasticizers, adipic acid esters, and numerous other types commonly used in this art.

The nature and proportions, etc., of the other components which can be included are well known in the art and are not within the scope of the invention.

The improved plasticizers and vinyl resin compositions of the present invention can be further illustrated by reference to the following examples. In the examples, the plasticizers were analyzed by gas chromatography, employing a Varian 2700, FID detector, with an HP 3380 integrator, using: 5'×⅛" NCW98 on Chromosorb W 80/100 mesh column and initial/final temperature of 95° C./340° C.; initial hold: 0 minutes; final hold: 5 minutes; program rate: 10° C./min; detector temp: 350° C.; injector temp: 285° C.; and sample size: 0.5 microliter. Light ends are reported as wt.% components in analyzed samples lighter boiling than the ester plasticizers.

In the Examples, the following analytical methods were used for the tests indicated.

| | |
|---|---|
| Shore D Hardness | ASTM D2240 |
| Tensile Strength | } ASTM D638-Modified Die |
| Elongation, % | |
| 100% Modulus | |
| Clash Berg T$_f$ | ASTM D1043 |
| Carbon black volatility | % wt loss after 24 hrs at 100° C. |
| Loop test, Compatibility | ASTM D3291 Sale: 0 = no exudation; 1 = very slight exudation; 2 = slight exudation; 3 = light exudation; 4 = medium exudation; and 5 = heavy exudation. |

EXAMPLE 1

Preparation of 1,2,4,5-Tetraisononyl Pyromellitate

To a 2 liter glass flask was added 218 gms of pyromellitic dianhydride (PMDA), 720 gms of iso-nonyl alcohol, together with 2.0 gms of tetra-isodecyl titanate catalyst. The alcohol was therefore used in a 0.25 molar excess over the amount stoichiometrically required to react with the PMDA charged. The reaction vessel was initially depressured to 600 mm Hg and the reaction was initiated by heating the liquid to reflux temperature from room temperature (about 25° C.) at a rate of about 5° to 6° C. per minute by means of a heating mantle, to a maximum temperature of about 200° C., with heat being thus supplied for a period of about 130 minutes under continuous stirring.

The reaction vessel was provided with a DEAN STARK trap in order to separate organic and aqueous phases which are taken overhead during the reaction and to recycle the organic phase containing the desired alcohol back to the reactor, thereby effectively removing water from reaction and forcing the equilibrium further in the direction of the desired tetraester. Temperature in this procedure was determined by means of a thermocouple immersed in the liquid reaction phase. The pressure in the reaction vessel was controlled to the extent necessary to provide continuous reflux at the selected temperature of reaction. A decrease in pressure over the above reaction time was necessary due to the consumption of the alcohol as the reaction proceeded.

At the end of the above reaction period, the reaction mixture was allowed to cool to 95° C., at which temperature the liquid is neutralized with 30% aqueous caustic followed by stirring for one-half hour at 95° C. Cool water was then added in an amount of 20 vol.% of the liquid reaction mixture. The resulting organic and aqueous phases were then separated and the recovered organic phase was washed with water until it was determined to be neutral by pH paper. Thereafter, the organic phase was steam stripped at 160° C. and 100 mm Hg to remove the unreacted alcohol, and then stripped with $N_2$ to remove any excess water. Thereafter, powdered carbon in an amount of 0.1 wt.% of the stripped reaction liquid and clay in an amount of 0.2 wt.% of the reaction liquid was added at 95° C. in order to decolor the pryomellitate tetraester. This mixture was stirred for one hour and then filtered to recover the desired 1,2,4,5-tetraisononyl pyromellitate, at a PMDA conversion of 99.7 mol.%. The pyromellitate thus recovered was found to have the physical properties set forth in Table II.

EXAMPLE 2

Preparation of 1,2,4,5-Tetraisodecyl Pyromellitate

The procedure of Example 1 was repeated employing 218 gms of PMDA, 790 gms of isodecyl alcohol and 2.0 gms of tetra-isodecyl titanate as catalyst. An initial reaction pressure of 600 mm Hg was used, and the reaction was carried out for 90 minutes under reflux to a maximum reaction temperature achieved was 220° C., and a final vessel pressure of 190 mm Hg. The recovered 1,2,4,5-tetraisodecyl pyromellitate was found to have been formed at a conversion of 99.1% based on the PMDA charged and was found to have the physical properties set forth in Table II.

EXAMPLE 3

Preparation of 1,2,4,5-Tetraisononyl Pyromellitate

The procedure of Example 1 was repeated except that the PMDA charged was replaced by 218 gms 1,2,4,5-tetracarboxylic acid, and similar results were obtained in the formation of the 1,2,4,5-tetraisononyl pyromellitate.

EXAMPLES 4-7 FOR COMPARISON

Preparation of Tetra-n-hexyl, Tetra-isoheptyl, Tetra-n-heptyl and Tetra-iso-octyl Pyromellitate In a series of runs, the procedure of Example 1 is repeated employing 218 gms of PMDA and the selected alcohol reactant (ROH, where R=n-hexyl, isoheptyl, n-heptyl and iso-octyl, respectively) employing the catalyst and run conditions set forth in Table I below, to prepare the corresponding 1,2,4,5-tetraalkyl pyromellitate.

The tetra-iso-nonyl pyromellitate ester of Example 1 was found to have a surprisingly low viscosity property as compared to known plasticizers such as tetra-n-hexyl pyromellitate and tetra-n-heptyl pyromellitate, which are of even lower molecular weight than the isononyl tetra-ester of this invention. The tetra isodecyl pyromellitate ester of Example 2 was found to also have surprisingly low viscosity properties compared to the tested comparative tetra-esters of lower molecular weight. Such low viscosity properties are very important in use of a compound as a primary or secondary plasticizer.

TABLE I
Preparation of Comparative Pyromellitates

|  | Comparative Example 3 | Comparative Example 4 | Comparative Example 5 | Comparative Example 6 |
|---|---|---|---|---|
| Alcohol | n-hexyl | iso-heptyl | n-heptyl | iso-octyl |
| gms charged | 490 | 580 | 580 | 624 |
| Catalyst | TIDT | TSA | TIDT | TIDT |
| gms charged | 1.3 | 8.0 | 2.0 | 1.3 |
| Reaction Pressure (mm Hg) | | | | |
| initial | 600 | 700 | 700 | 600 |
| final | 600 | 100 | 700 | 400 |
| Reaction Temp. °C. (max) | 220 | 160 | 220 | 190 |
| % PMDA Conversion | 99 | 99 | 99.7 | 99.9 |

Notes:
TIDT = tetraisodecyl titanate.
TSA = para-toluene sulfonic acid (35%).
PMDA = pyromellitic dianhydride.

TABLE II
Physical Properties

Pyromellitate Ester,

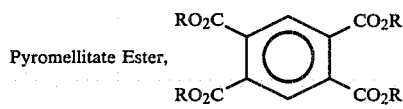

| Physical Property | Example 1 R = iso-nonyl | Example 2 R = isodecyl | Comp. Ex 3 R = n-hexyl | Comp. Ex 4 R = isoheptyl | Comp. Ex 5 R = n-heptyl | Comp. Ex 6 R = iso-octyl |
|---|---|---|---|---|---|---|
| Light ends, wt. % | .003 | .08 | .003 | .04 | 0.1 | .01 |
| Sp. Grav., at 20/20° C. | .9797 | .9595 | 1.1096 | 1.0060 | 1.006 | .9937 |
| Refractive Index, at 20° C. | 1.4840 | 1.4786 | 1.4856 | 1.4852 | 1.4852 | 1.4845 |
| Viscosity, cs. | | | | | | |
| at 25° C. | — | 208 | 220 | 208 | — | — |
| at 43° C. | 237 | 136 | 101 | 141 | — | — |
| at 99° C. | 18.5 | 12.8 | 11.2 | 13.8 | — | — |

EXAMPLES 8–9 FOR COMPARISON
Preparation of Tri-isooctyl and Tri-isononyl Trimellitate The procedure of Example 1 was again repeated in several runs except that trimellitic acid (TMA) (1,2,4-benzenetricarboxylic acid) was used instead of the PMDA, and the alcohol comprised either iso-octyl alcohol (Comp. Ex. 8) or iso-nonyl alcohol (Comp. Ex. 9), using the amounts and reaction conditions as summarized in Table III below:

TABLE III

|  | Comparative Example 8 | Comparative Example 9 |
|---|---|---|
| TMA gms charged | 431 | 192 |
| Alcohol | iso-octyl | iso-nonyl |
| gms charged | 1050 | 518 |
| Catalyst[(1)] | TIDT | TIDT |
| gms charged | 3.0 | 2.0 |
| Reaction Pressure (mm Hg) | | |
| initial | 600 | 600 |
| final | 400 | 400 |
| Reaction Temp., °C. | 220 | 220 |

TABLE III-continued

|  | Comparative Example 8 | Comparative Example 9 |
|---|---|---|
| (max) | | |
| Reaction time (min) | 120 | 110 |
| % Trimellitic Acid Conversion | 99.4 | 99.2 |

[(1)]TIDT = tetra-isodecyl titanate

EXAMPLE 10

A series of eight PVC compositions were formulated using the pyromellitate esters of Examples 1 and 2 and Comparative Examples 4–7 and the trimellitate esters of Comparative Examples 8 and 9 as the primary plasticizer and the additional components identified in Table IV in the proportions indicated.

Thereafter, wet blends were prepared using a Hobart mixer, and each wet blend composition was milled at 350° F. for 5 minutes (after 1 minute of preheat at 350° F.) using an 8"×16" Farrell two roll mill and then a (3'×16"×40 mil) sheet was withdrawn, cut and molded (at 360° F.) to the desired thickness. Physical measurements were made on each molded specimen to determine various important properties, and the data thereby obtained are summarized in Table V–VI.

TABLE VI
PVC Formulations

| Component | Parts by Weight | wt. % |
|---|---|---|
| GEON 30 (1) | 100 | 63.6 |
| Plasticizer* | 50 | 31.8 |
| Dythal (2) | 7 | 4.4 |
| Stearic Acid | 0.25 | 0.17 |
| TOPANOL CA (3) | 0.05 | 0.03 |
| TOTAL | 157.30 | 100.0 |

Notes:
(1) Polyvinyl chloride resin (BF Goodrich Chemical Co.)
(2) Lead stabilizer (Associated Lead, Inc.)
(3) Antioxidant (ICI Americas, Inc.)

| *Run No. | Plasticizer | Prepared As In |
|---|---|---|
| 10-1 | tri-isooctyl trimellitate (TIOTM) | Comp. Ex. 8 |
| 10-2 | tri-isononyl trimellitate (TINTM) | Comp. Ex. 9 |
| 10-3 | tetra-n-hexyl pyromellitate (THPM) | Comp. Ex. 4 |
| 10-4 | tetra-iso-heptyl pyromellitate (TIHPM) | Comp. Ex. 5 |
| 10-5 | tetra-n-heptyl pyromellitate (TNHPM) | Comp. Ex. 6 |

-continued

| *Run No. | Plasticizer | Prepared As In |
|---|---|---|
| 10-6 | tetra-iso-octyl pyromellitate (TIOPM) | Comp. Ex. 7 |
| 10-7 | tetra-iso-nonyl pyromellitate (TINPM) | Example 1 |
| 10-8 | tetra-iso-decyl-pyromellitate (TIDPM) | Example 2 |

TABLE V

| Plasticizer | TIOTM | TINTM | THPM | TIHPM | TNHPM | TIOPM | TINPM | TIDPM |
|---|---|---|---|---|---|---|---|---|
| Formulation | 10-1 | 10-2 | 10-3 | 10-4 | 10-5 | 10-6 | 10-7 | 10-8 |
| Tetra-alkyl group | i-$C_8$ | i-$C_9$ | n-$C_6$ | i-$C_7$ | n-$C_7$ | i-$C_8$ | i-$C_9$ | i-$C_{10}$ |
| Shore D Hardness | 43.7 | 45.1 | 41.8 | 43.5 | 38.1 | 45.0 | 48.9 | 49.7 |
| Tensile Strength, psi | 3393 | 3367 | 3271 | 3330 | 3412 | 3450 | 3067 | 2889 |
| 100% Modulus, psi | 2407 | 2369 | 2349 | 2450 | 2148 | 2481 | 2396 | 2337 |
| Elongation, % | 268 | 289 | 279 | 277 | 324 | 304 | 252 | 219 |
| Clash Berg, $T_f$, °C. | −10.0 | −12.6 | −5.0 | −4.5 | −15.4 | −7.0 | −11.2 | −20.0 |
| C. Black Volatility, | 0.21 | 0.25 | 0.18 | 0.28 | 0.23 | 0.40 | 0.24 | 0.40 |
| Pad Volume Resistivity 90° C., (ohm-cm × $10^{11}$) | 1.06 | 1.04 | 1.97 | 0.57 | 2.63 | 6.68 | 1.90 | 1.58 |
| ⅜" Loop Compatibility 24 hrs | 1.0 | 1.5 | 0 | 0 | 0.5 | 0.3 | 0.5 | 2.5 |
| Compatible | yes | yes | yes | yes | yes | yes | yes | yes |

TABLE VI

Aging Properties

| Plasticizer | TIOTM | TINTM | THPM | TIHPM | TNHPM | TIOPM | TINPM | TIDPM |
|---|---|---|---|---|---|---|---|---|
| Formulation | 10-1 | 10-2 | 10-3 | 10-4 | 10-5 | 10-6 | 10-7 | 10-8 |
| Tetra-alkyl group | i-$C_8$ | i-$C_9$ | n-$C_6$ | i-$C_7$ | n-$C_7$ | i-$C_8$ | i-$C_9$ | i-$C_{10}$ |
| Retained Elongation, % | | | | | | | | |
| 7 days | 105.6 | 101.7 | 101.1 | 107.9 | 102.8 | 96.4 | 113.5 | 107.3 |
| 21 days | 82.1 | 81.3 | 102.5 | 89.9 | 87.3 | — | 77.0 | 77.2 |
| Retained Tensile, psi | | | | | | | | |
| 7 days | 99.9 | 100.0 | 100.7 | 103.9 | 101.9 | 104.1 | 106.1 | 101.8 |
| 21 days | 92.7 | 94.9 | 102.5 | 97.0 | 95.2 | — | 93.5 | 92.8 |
| Volatility, wt. % | | | | | | | | |
| 7 days | 1.8 | 1.1 | 0.7 | 0.7 | 0.5 | 0.5 | 0.5 | 0.6 |
| 14 days | 3.5 | 1.9 | 1.2 | 0.9 | 0.7 | — | 0.6 | 0.8 |
| 21 days | 4.8 | 2.5 | 1.6 | 1.5 | 0.8 | — | 1.3 | 1.5 |
| 21 days: | | | | | | | | |
| Tensile strength, psi | 3146 | 3196 | 3352 | 3231 | 3248 | — | 2867 | 2682 |
| % Elongation | 220 | 235 | 286 | 274 | 283 | — | 194 | 169 |
| 100% Modulus, psi | 2660 | 2585 | 2485 | 2558 | 2309 | — | 2573 | 2440 |

Referring to FIG. 1, it can be seen the tetra(iso-nonyl)pyromellitate and tetra(iso-decyl)pyromellitate plasticizers of this invention provide improved low temperature flexibility properties in the molded PVC specimens as compared with the other tested trimellitate and pyromellitate compounds as plasticizers, at equivalent hardness levels. The data in this Example 10 also show that TINPM is more compatible than TINTM, at equivalent hardness levels.

EXAMPLE 11

A separate series of four PVC formulations were prepared employing the primary plasticizers and other components identified in Table VII:

Thereafter, following milling and molding as in Example 10, physical measurements were made on each molded PVC specimen, and the data thereby obtained are summarized in Table VIII.

TABLE VII

PVC Formulations

| Component | Parts by Weight | wt. % |
|---|---|---|
| GEON 30[1] | 100 | 63.5 |
| Plasticizer* | 50 | 31.8 |
| Dythal[1] | 7 | 4.4 |
| Topanol CA[1] | 0.15 | 0.1 |
| Stearic Acid[1] | 0.25 | 0.2 |
| Total | 157.40 | 100.0 |

| Run No. | Plasticizer* | Prepared As In: |
|---|---|---|
| 11-1 | tri-isonoyl trimellitate (TINTM) | Comp. Ex. 10 |
| 11-2 | tetra-isoheptyl pyromellitate (TIHPM) | Comp. Ex. 5 |
| 11-3 | tetra-isononyl pyromellitate (TINPM) | Example 1 |
| 11-4 | tetra-isodecyl pyromellitate (TIDPM) | Example 2 |

[1]For sources, see footnotes to Table IV above.

TABLE VIII

| Plasticizer | TINTM | TIHPM | TINPM | TIDPM |
|---|---|---|---|---|
| Formulation | 11-1 | 11-2 | 11-3 | 11-4 |
| Tetra-alkyl group | i-$C_9$ | i-$C_7$ | i-$C_9$ | i-$C_{10}$ |
| Physical Data | | | | |
| Shore "D" hardness | 46.9 | 46.9 | 50.0 | 50.9 |
| Tensile strength, psi | 3050 | 3320 | 3210 | 3110 |
| Elongation, % | 190 | 215 | 210 | 200 |
| 100% Modulus, psi | 2600 | 2690 | 2630 | 2530 |
| Clash Berg, $T_f$, °C. | −13.0 | −3.5 | −11.2 | −16.5 |
| Compatibility Testing, ⅜" loop test Amount of exudation at | | | | |
| 1 day | 0 | 0 | 0 | 0 |
| 3 days | 0.5 | 0 | 0.5 | 1.5 |
| 7 days | 1.0 | 0 | 0.5 | 0.5 |
| Weight Loss, 136° C., wt. % | | | | |
| 7 days | 2.1 | 1.3 | 1.1 | 1.1 |
| 14 days | 3.4 | 2.4 | 1.9 | 2.1 |
| 21 days | 5.9 | 4.2 | 3.2 | 3.5 |
| 28 days | 8.3 | 5.5 | 4.3 | 4.7 |
| 32 days | 9.3 | 6.3 | 4.9 | 5.3 |
| Aged Physicals, | | | | |

TABLE VIII-continued

| Plasticizer | TINTM | TIHPM | TINPM | TIDPM |
|---|---|---|---|---|
| Formulation | 11-1 | 11-2 | 11-3 | 11-4 |
| Tetra-alkyl group | i-$C_9$ | i-$C_7$ | i-$C_9$ | i-$C_{10}$ |
| 32 days at 136° C. | | | | |
| Tensile strength, psi | 2780 | 2900 | 2800 | 2650 |
| Elongation, % | 90 | 140 | 125 | 105 |
| 100% Modulus, psi | — | 2740 | 2765 | 2630 |
| Retained Elongation, % | 47 | 65 | 60 | 53 |

Therefore, it was surprisingly found, contrary to the negative teachings of the prior art, that tetra-isononyl and tetra-isodecyl pyromellitate esters are compatible with PVC and can function as improved primary plasticizers. Indeed, it was found that TINPM (an iso-$C_9$ pyromellitate tetra ester) was more compatible than the lower molecular weight TINTM (an iso-$C_9$ trimellitate tri-ester).

Furthermore, the data in Table VIII again reveal the advantageous low temperature flexibility ($T_f$) imparted to the plastic samples by use of TINPM and TIDPM.

In the aging study (in which the plastic samples were subjected to high temperatures to obtain accelerated data for comparing heat degradation and retained properties), both TINPM and TIDPM plasticized samples were found to exhibit low weight losses on aging. Both TINPM and TIDPM showed lower weight losses than the lower molecular weight TIHPM sample.

EXAMPLE 12

Following the procedure of Example 11, a series of six PVC formulations were prepared having the compositions indicated in Table IX:

TABLE IX

| | PVC FORMULATIONS | | | | | |
|---|---|---|---|---|---|---|
| Formulation No: | (Components in phr) | | | | | |
| Component | 12-1 | 12-2 | 12-3 | 12-4 | 12-5 | 12-6 |
| GEON 99[1] | 100 | 100 | 100 | 100 | 100 | 100 |
| TINTM | 50 | — | 50 | — | 50 | — |
| TINPM | — | 50 | — | 50 | — | 50 |
| Clay[2] | 5 | 5 | 5 | 5 | 5 | 5 |
| LECTRO 125M[3] | 45 | 45 | — | — | 40 | 40 |
| LECTRO 125XLP[3] | — | — | 15 | 15 | 5 | 5 |
| Stearic acid | .25 | .25 | .25 | .25 | .25 | .25 |
| Topanol CA[4] | .25 | .25 | .25 | .15 | .25 | .25 |

Notes:
[1] Polyvinyl chloride resin (BF Goodrich Chemical Co.)
[2] Electrical Grade Clay, SP-33 (Freeport Kaolin Co.)
[3] Lead barium stabilizers (Associated Lead, Inc.)
[4] Antioxidant (ICI Americas, Inc.)

Thereafter, molded PVC specimens are prepared following the milling and molding procedure of Example 10, and physical measurements on each specimen were made before and after oven aging at 158° C. The data thereby obtained are summarized in Table X below.

TABLE X

| Plasticizer: | TINTM | TINPM | TINTM | TINPM | TINTM | TINPM |
|---|---|---|---|---|---|---|
| Formulation: | 12-1 | 12-2 | 12-3 | 12-4 | 12-5 | 12-6 |
| Tetra-alkyl group | i-$C_9$ | i-$C_9$ | i-$C_9$ | i-$C_9$ | i-$C_9$ | i-$C_9$ |
| Physical Data | | | | | | |
| Shore D Hardness | 47 | 47 | 42 | 45 | 46 | 49 |
| Tensile Strength, psi | 3250 | 3010 | 3700 | 3350 | 3130 | 2880 |
| Elongation, % | 275 | 265 | 320 | 280 | 280 | 250 |
| 100% Modulus, psi | 2215 | 2200 | 2299 | 2280 | 2115 | 2065 |
| Aged Physicals - 3 days at 158° C. | | | | | | |
| Tensile strength, psi | 3520 | 2820 | 4095 | 3435 | 3670 | 2840 |
| Elongation, % | 56 | 163 | 197 | 269 | 91 | 184 |
| 100% Modulus, psi | — | 2710 | 3970 | 2930 | — | 2650 |
| Retained tensile, % | 108 | 94 | 111 | 103 | 117 | 99 |
| Retained elongation, % | 21 | 62 | 61 | 96 | 32 | 74 |
| Weight loss at 158° C. | | | | | | |
| 1 day | 5.9 | 2.3 | 6.5 | 2.7 | 6.2 | 2.7 |
| 2 days | 7.6 | 2.7 | 8.2 | 3.1 | 7.6 | 3.0 |
| 3 days | 9.4 | 3.4 | 10.2 | 3.8 | 9.0 | 3.3 |

Each pair of samples in Runs 12-1 through 12-6 were formulated at approximately equal hardness levels, and again the improved plasticizer performance of TINPM, as compared to TINTM is observed. In particular, in comparing the aged physical data after three days at 158° C., it can be seen that the TINPM-plasticized samples have a far higher percent retained elongation than the TINPM samples. Also, the samples plasticized with TINPM again show much lower weight loss after three days of high temperature aging.

From the foregoing description, one skilled in the art can easily ascertain the essential characteristics of this invention and without departing from the spirit and scope thereof can make various changes and/or modifications to the invention for adapting it to various usages and conditions. Accordingly, such changes and modifications are properly intended to be within the full range of equivalents of the following claims.

What is claimed is:

1. Compounds of the formula:

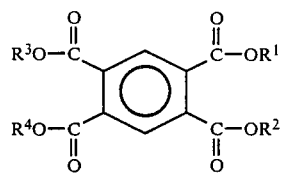

wherein $R^1$, $R^2$, $R^3$ and $R^4$ are the same or different and are selected from the group consisting of iso-nonyl and iso-decyl.

2. Compounds of the formula:

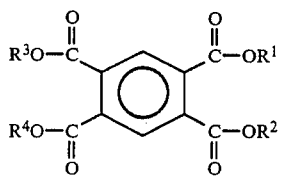

wherein $R^1$, $R^2$, $R^3$ and $R^4$ are each iso-nonyl.

3. Compounds of the formula:

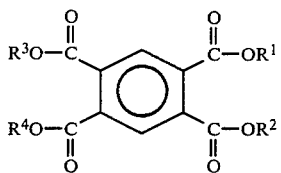

wherein $R^1$, $R^2$, $R^3$ and $R^4$ are each iso-decyl.

4. In plasticized poly vinyl chloride compositions, the improvement which comprises employing as the primary plasticizer at least one compound of the formula:

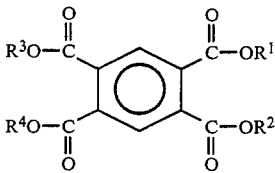

wherein $R^1$, $R^2$, $R^3$ and $R^4$ are the same or different and comprise members selected from the group consisting of iso-nonyl and iso-decyl.

5. The improved plasticized compositions of claim 4 wherein said primary plasticizer is employed in said composition in an amount of from about 1 to 200 parts of said primary plasticizer per hundred parts of said composition.

* * * * *